(12) United States Patent
Jonsson et al.

(10) Patent No.: US 8,848,762 B2
(45) Date of Patent: Sep. 30, 2014

(54) CONFIGURATION OF WIRELESS RECEIVER

(75) Inventors: Elias Jonsson, Malmo (SE); Eric Blanquer, Malmo (SE); Kazuyoshi Uesaka, Kawasaki (JP)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 496 days.

(21) Appl. No.: 13/021,438

(22) Filed: Feb. 4, 2011

(65) Prior Publication Data
US 2012/0195211 A1 Aug. 2, 2012

Related U.S. Application Data

(63) Continuation of application No. PCT/EP2011/051375, filed on Feb. 1, 2011.

(51) Int. Cl.
*H04B 1/00* (2006.01)
*H03K 9/00* (2006.01)

(52) U.S. Cl.
CPC .. *H04B 1/70973* (2013.01); *H04B 2201/70702* (2013.01); *H04B 2201/7071* (2013.01); *H04B 2201/70701* (2013.01)
USPC ............ 375/136; 375/147; 375/150; 375/316

(58) Field of Classification Search
USPC ......... 375/130, 140, 135, 136, 134, 146, 147, 375/142, 144, 148, 150, 152, 295, 316, 340, 375/346, 348, 350
See application file for complete search history.

(56) References Cited

U.S. PATENT DOCUMENTS

| | | | |
|---|---|---|---|
| 7,035,661 B1 | 4/2006 | Yun | |
| 2003/0096618 A1* | 5/2003 | Palenius | 455/453 |
| 2007/0042784 A1 | 2/2007 | Anderson | |
| 2009/0110036 A1 | 4/2009 | Luschi et al. | |
| 2009/0110048 A1 | 4/2009 | Luschi et al. | |
| 2009/0111413 A1* | 4/2009 | Luschi et al. | 455/230 |
| 2009/0113429 A1 | 4/2009 | Luschi et al. | |
| 2010/0136933 A1 | 6/2010 | Rofougaran | |
| 2011/0032837 A1* | 2/2011 | Luschi et al. | 370/252 |
| 2011/0075706 A1* | 3/2011 | Cairns et al. | 375/144 |

FOREIGN PATENT DOCUMENTS

| | | |
|---|---|---|
| EP | 1 786 228 A1 | 5/2007 |
| EP | 1 804 542 A1 | 7/2007 |
| WO | 02/23742 A2 | 3/2002 |

OTHER PUBLICATIONS

PCT International Search Report, mailed Oct. 27, 2011, in connection with counterpart application PCT/EP2011/051375.
PCT Written Opinion, mailed Oct. 27, 2011, in connection with counterpart application PCT/EP2011/051375.
Bottomley, G. et al. "A Generalized RAKE Receiver for Interference Suppression" IEEE Journal on Selected Areas in Communications, vol. 18, No. 8, Aug. 2000, pp. 1536-1545.

* cited by examiner

*Primary Examiner* — Sam K Ahn
*Assistant Examiner* — Linda Wong
(74) *Attorney, Agent, or Firm* — Leffler Intellectual Property Law, PLLC (57) ABSTRACT

This disclosure is directed to a wireless receiver and a method for configuring the wireless receiver, comprising the actions of determining a geometry factor for a channel over which signals are transmitted to the wireless receiver, the geometry factor being a measure indicative of inter-cell interference plus noise power at the wireless receiver; determining the variance of the determined geometry factor, the variance being a measure indicative of the variation in time or rate of the geometry factor; and configuring the wireless receiver based on the geometry factor and the variance of the geometry factor.

28 Claims, 4 Drawing Sheets

CONFIGURATION OF WIRELESS RECEIVER

CROSS-REFERENCE TO RELATED APPLICATIONS

This is a continuation of International Application PCT/EP2011/051375, with an international filing date of Feb. 1, 2011, now pending, which is hereby incorporated herein by reference in its entirety.

TECHNICAL FIELD

The present invention generally relates to configurable wireless receivers, and more particularly relates to configuring a wireless receiver based on an estimate of channel geometry.

BACKGROUND

In WCDMA (Wideband CDMA) systems, the wireless receiver must demodulate and decode data effectively across a wide range of operating conditions. Some operating conditions that affect receiver performance include channel dispersion, receiver speed and channel geometry (the ratio of transmitter power to cumulative interference plus noise power). Ideally, a wireless receiver should obtain the best possible performance given the operating conditions. One approach to maximize performance is a fixed receiver configuration. Alternatively, the receiver can detect operating conditions and re-configure itself (adaptive configuration).

To obtain the best possible performance given the operating conditions, a fixed configuration receiver must be designed to handle worst-case operating conditions. For example, the wireless receiver must be equipped to handle extremely high speeds and a highly dispersive channel as well as no motion and a flat channel. Such a receiver would be extremely expensive in terms of power, computational complexity, and chip area, and is thus not practical. In contrast, a limited fixed receiver configuration focuses on a particular range of operating conditions to reduce receiver cost and complexity. While this approach generally works well for the expected range of operating conditions, overall receiver performance degrades when actual operating conditions differ from the expected operating conditions. The degradation can be significant and seriously impact the ability of the receiver to offer, for example, both peak data rates and robust performance at low SIR (Signal-to-Interference Ratio).

Other types of conventional receivers have a reconfigurable equalizer. In some cases, the equalizer is reconfigured as a function of receiver speed. For example, a nonparametric equalizer is employed at low speeds whereas a parametric equalizer is employed otherwise. In other cases, the equalizer is reconfigured as a function of channel dispersion. For example, the equalizer may employ a grid of equalizer fingers (symbol-level) or equalizer taps (chip-level) spaced at equidistant intervals. The grid spacing and extent (i.e. number of fingers/taps) is then varied as a function of channel dispersion. In each of these cases, only the equalizer is reconfigured as a function of either receiver speed or channel dispersion, limiting receiver adaptability.

SUMMARY

Adaptive configuration of a wireless receiver is enabled based on channel geometry and the variance of the channel geometry. According to an embodiment, the wireless receiver may include a geometry factor processing module, a geometry factor variance processing module and signal processing circuits, e.g. such as but not limited to an SIR (signal-to-interference ratio) estimation module, a power estimation module, a despreading module, a low-pass filter, a combing weight generation module, a coefficient estimation module, a synchronization control channel interference canceller module, etc.

The geometry factor processing module is configured to operatively determine a geometry factor for the channel over which signals are transmitted to the wireless receiver. The geometry factor may e.g. be a measure or an estimation or similar indicative of the inter-cell interference (i.e. other-cell interference) plus noise power at the wireless receiver. The geometry factor may e.g. be determined based on a SIR value or similar, or on an inverse of a SIR value or similar possibly multiplied with a scaling factor. A skilled person having the benefit of this disclosure realizes that the geometry factor may be determined by other suitable measures and/or estimations or similar.

The geometry factor variance processing module is configured to operatively determine a geometry factor variance for the geometry factor. The geometry factor variance is a measure of the variation in time or rate of change of the geometry factor. Mathematically the variance of the geometry factor may e.g. correspond to the distribution of the geometry factor. The geometry factor may vary in a periodic or in a random fashion. A skilled person having the benefit of this disclosure realizes that, in addition to the measures and/or estimations or similar disclosed herein, the variance of the geometry factor may be determined by any suitable measures and/or estimations or similar.

One or more of the receiver signal processing circuits are configurable based on the geometry factor and the variance of the geometry factor. For example, the functions or algorithms implemented by one or more of the signal processing circuits can be configured responsive to the geometry factor and the variance of the geometry factor. In addition or alternatively, the parameters input to the signal processing circuits can also be configured responsive to the geometry factor and the variance of the geometry factor. In each case, a wireless receiver that is highly adaptive to interference conditions is provided.

The embodiments described herein may be summarized in the following manner.

One embodiment is directed to a method for configuring a wireless receiver. The method comprises the actions of: determining a geometry factor for a channel over which signals are transmitted to the wireless receiver, the geometry factor being a measure indicative of inter-cell interference plus noise power at the wireless receiver; determining the variance of the determined geometry factor, the variance being a measure indicative of the variation in time or rate of change of the geometry factor; and configuring the wireless receiver based on the geometry factor and the variance of the geometry factor.

Determining the geometry factor may comprise the actions of: estimating a signal-to-interference ratio, SIR, at the wireless receiver; and determining the geometry factor based on the SIR estimate.

The SIR may be estimated based on channel estimates derived by the wireless receiver from a pilot signal transmitted over a pilot channel, the pilot channel having a transmit power level which is unknown to the wireless receiver, and wherein the transmit power level of the pilot channel is estimated at the wireless receiver, and the geometry factor is determined based on a ratio of the pilot channel transmit power level estimate to the SIR estimate.

Determining the geometry factor may comprise the actions of: computing combining weights and net channel coefficients by the wireless receiver; determining a degree of correlation between the combing weights and the net channel coefficients; and determining the geometry factor based on the degree of correlation between the combing weights and the net channel coefficients.

The geometry factor may be set to a first value indicating a relatively high degree of interference responsive to the degree of said correlation being above a particular first threshold value set by the wireless receiver; and otherwise setting the geometry factor to a second value indicating a relatively low degree of interference.

Determining the geometry factor may comprise the actions of: computing a first SIR value when the wireless receiver is configured as a maximum ratio combining receiver and a second SIR value when the wireless receiver is configured as an equalizing receiver; and determining the geometry factor based on a ratio of the first and second SIR values.

Determining the variance of the geometry factor may comprise the actions of: computing an average value of the geometry factor; computing a ratio of said geometry factor and said average value; obtaining the largest value of said ratio and the inverse of said ratio; and determining the variance of the geometry factor based on said largest value.

Determining the variance of the geometry factor may comprise the actions of: computing an average of the geometry factor; computing for a number of samples of the geometry factor, a difference between the average of the geometry factor and each of said sampled value of the geometry factor; computing a mean value of the sum of each difference; and determining the variance of the geometry factor based on said mean value.

Determining the variance of the geometry factor may comprise the actions of: obtaining frequency components of the geometry factor, which geometry factor varies over time; and determining the variance of the geometry factor by analyzing the amount of energy represented by the frequency components.

Configuring the wireless receiver may comprise the actions of configuring one or more functions or algorithms implemented by one or more of receiver signal processing circuits of the receiver based on the geometry factor and the variance of the geometry factor, and/or configuring one or more parameters being input to the receiver signal processing circuits based on the geometry factor and the variance of the geometry factor.

Configuring the wireless receiver may comprise the actions of determining, as a function of the geometry factor and the variance of the geometry factor, a number of equalizer fingers or equalizer taps used by the wireless receiver for cancelling interference.

The equalization at the wireless receiver may be disabled and the wireless receiver may be configured for maximum ratio combining responsive to the geometry factor being below a particular second threshold and the variance of the geometry factor being above a particular third threshold.

Configuring the wireless receiver may comprise the actions of determining, as a function of the geometry factor and the variance of the geometry factor, an amount of filtering applied to one or more estimates generated by the one or more signal processing circuits of the wireless receiver.

Configuring the wireless receiver may comprise the actions of determining, as a function of the geometry factor and the variance of the geometry factor, an amount of filtering applied to at least one of a non-parametric impairment covariance estimate and an SIR estimate generated by the wireless receiver.

Configuring the wireless receiver may comprise the actions of determining, as a function of the geometry factor and the variance of the geometry factor, a number of parameters estimated by the wireless receiver during parametric equalization.

Configuring the wireless receiver may comprise the actions of determining, as a function of the geometry factor and the variance of the geometry factor, an amount of soft scaling applied to symbols received by the wireless receiver which are subject to interference caused by a downlink synchronization channel.

Configuring the wireless receiver may comprise the actions of determining, as a function of the geometry factor and the variance of the geometry factor, whether to enable or disable an interference canceller module circuit of the wireless receiver and wherein the interference canceller module circuit being operable to suppress the interference caused by the downlink synchronization channel.

Another embodiment is directed to a wireless receiver. The wireless receiver comprises: a geometry factor processing circuit operable to determine a geometry factor for a channel over which signals are transmitted to the wireless receiver, the geometry factor being a measure indicative of intra cell interference plus noise power at the wireless receiver; and a geometry factor variance processing circuit operable to determine the variance of the geometry factor, the variance being a measure indicative of the variation in time or rate of change of the geometry factor. The wireless receiver is operable to be configured based on the geometry factor and the variance of the geometry factor.

The wireless receiver may comprise a signal-to-interference ratio, SIR, estimation circuit operable to generate a SIR estimate, and the geometry factor processing circuit may be operable to determine the geometry factor based on the SIR estimate.

The wireless receiver may comprise a SIR estimation circuit operable to estimate the SIR based on channel estimates derived by the wireless receiver from a pilot signal transmitted over a pilot channel, the pilot channel having a transmit power level which is unknown to the wireless receiver. The wireless receiver may also comprise a power estimation circuit operable to estimate the transmit power level of the pilot channel at the wireless receiver. Here, the geometry factor processing circuit may be operable to determine the geometry factor based on a ratio of the pilot channel transmit power level estimate to the SIR estimate.

The wireless receiver may comprise a combining weight generation circuit operable to compute combining weights and net channel coefficients; a coefficient estimation circuit operable to determine a degree of correlation between the combing weights and the net channel coefficients. Here the geometry factor processing circuit may be operable to determine the geometry factor based on the degree of correlation between the combing weights and the net channel coefficients.

The geometry factor processing circuit may be operable to set the geometry factor to a first value indicating a relatively high degree of interference responsive to the degree of said correlation being above a particular first threshold value; and otherwise set the geometry factor to a second value indicating a relatively low degree of interference.

The wireless receiver may comprise a SIR estimation circuit operable to compute a first SIR value when the wireless receiver is configured as a maximum ratio combining receiver and a second SIR value when the wireless receiver is configured as an equalizing receiver. Here, the geometry factor processing circuit may be operable to determine the geometry factor based on a ratio of the first and second SIR values.

The geometry factor variance processing circuit may be operable to compute an average value of the geometry factor, and compute a ratio of said geometry factor and said average value, and obtain the largest value of said ratio and the inverse of said ratio, and determine the variance of the geometry factor based on said largest value.

The geometry factor variance processing circuit may be operable to compute an average of the geometry factor, and to compute for a number of samples of the geometry factor, a difference between the average of the geometry factor and each of said sampled value of the geometry factor, and to compute a mean value of the sum of each difference, and to determine the variance of the geometry factor based on said mean value.

The geometry factor variance processing circuit may be operable to obtain frequency components of the geometry factor, which geometry factor varies over time, and determine the variance of the geometry factor by analyzing the amount of energy represented by the frequency components.

At least one of the geometry factor processing circuit and the geometry factor variance processing circuit may be operable to configure one or more functions or algorithms implemented by one or more receiver signal processing circuits of the receiver based on the geometry factor and the variance of the geometry factor, and/or to configure one or more parameters being input to the receiver signal processing circuits based on the geometry factor and the variance of the geometry factor.

At least one of the geometry factor processing circuit and the geometry factor variance processing circuit may be operable to determine, as a function of the geometry factor and the variance of the geometry factor, a number of equalizer fingers or equalizer taps for interference cancellation.

At least one of the geometry factor processing circuit and the geometry factor variance processing circuit may be operable to disable equalization and enable maximum ratio combining at the wireless receiver responsive to the geometry factor being below a particular threshold and the variance of the geometry factor being above a particular threshold.

At least one of the geometry factor processing circuit and the geometry factor variance processing circuit may be operable to determine, as a function of the geometry factor and the variance of the geometry factor, an amount of filtering applied to one or more estimates generated by the one or more signal processing circuits.

At least one of the geometry factor processing circuit and the geometry factor variance processing circuit may be operable to determine, as a function of the geometry factor and the variance of the geometry factor, an amount of filtering applied to at least one of a non-parametric impairment covariance estimate and an SIR estimate.

At least one of the geometry factor processing circuit and the geometry factor variance processing circuit may be operable to determine, as a function of the geometry factor and the variance of the geometry factor, a number of parameters estimated during parametric equalization.

At least one of the geometry factor processing circuit and the geometry factor variance processing circuit may be operable to determine, as a function of the geometry factor and the variance of the geometry factor, an amount of soft scaling applied to symbols received by the wireless receiver which are subject to interference caused by a downlink synchronization channel.

At least one of the geometry factor processing circuit and the geometry factor variance processing circuit is operable to determine whether to enable or disable an interference canceller circuit as a function of the geometry factor and the variance of the geometry factor, and wherein the interference canceller circuit being operable to suppress the interference caused by the downlink synchronization channel.

Of course, the present invention is not limited to the above features and advantages. Those skilled in the art will recognize additional features and advantages upon reading the following detailed description, and upon viewing the accompanying drawings.

It should be emphasized that the term "comprises/comprising" when used herein is taken to specify the presence of stated features, integers, steps or components, but does not preclude the presence or addition of one or more other features, integers, steps, components or groups thereof.

DETAILED DESCRIPTION

Figure 1:
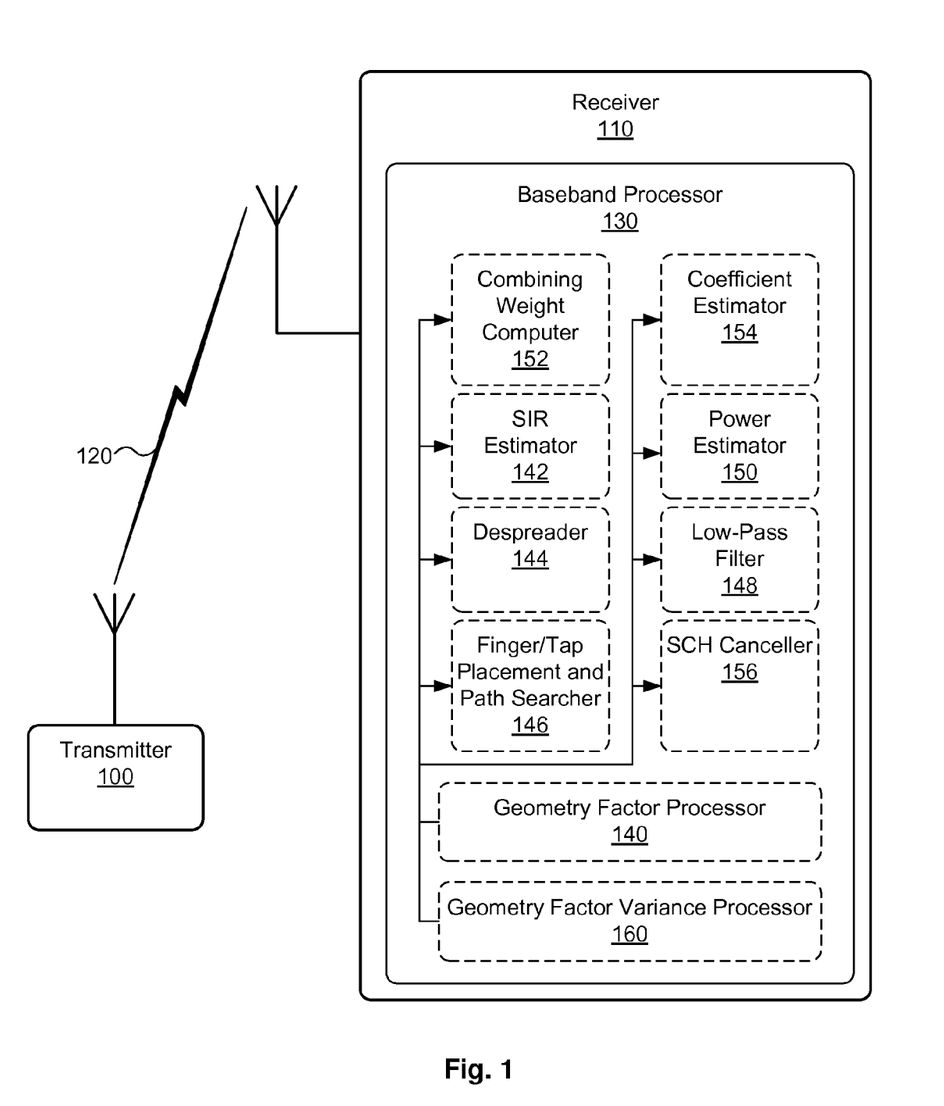
FIG. 1 illustrates a block diagram of an embodiment of a receiver including a geometry factor processing module.

FIG. 1 illustrates an embodiment of a wireless transmitter 100 in communication with a wireless receiver 110 over a channel 120. The receiver 110 includes a baseband processor 130. Various signal processing modules are included in or associated with the baseband processor 130. The signal processing modules are configured to operatively implement various functions or algorithms based on parameters input to the modules, enabling the receiver 110 to function properly. One or more of the signal processing modules are configured to be operatively configured based on a geometry factor and the variance of the geometry factor determined for the channel 120 over which signals are transmitted to the receiver 110. The signals can be transmitted to the receiver 110 in the uplink direction (i.e. mobile station to base station) or the downlink direction (i.e. base station to mobile station). In either case, the geometry factor may be measure of the interference and noise (impairment) from all other cells (other-cell/inter-cell interference) and radio noise. It may be e.g. a measure of the ratio of total transmitted power received by the wireless receiver 110 to the total interference plus noise power at the wireless receiver 110.

Thus, the receiver 110 includes a geometry factor processing module 140 included in or associated with the baseband processor 130, which processing module 140 may e.g. be configured to operatively determine the geometry factor ρ based on:

$$\rho = \frac{\hat{I}_{or}}{I_{oc}} \quad (1)$$

where $I_{oc}$ is the total interference plus noise power at the wireless receiver 110 and $\hat{I}_{or}$ is the total transmitter power received by the receiver 110 or at least an estimated part of the total transmitted power received by the receiver 110. The channel geometry factor ρ is a location dependent value for each user in the same cell. For locations close to the transmitter 100, the interference is likely to be relatively low (i.e., high geometry), while for locations close to the cell edge, the interference is likely to be relatively high (i.e., low geometry). Configuring one or more of the signal processing modules as a function of the geometry factor ρ enables the receiver 110 to readily adapt to changing interference conditions, improving receiver performance and reliability, e.g. by increasing throughput and/or reducing error rate.

Various other embodiments for determining the geometry factor ρ are described next with reference to symbol-level equalization and chip-level equalization. Naturally, the geometry factor processing module 140 may be configured to operatively determine the geometry factor ρ according to these embodiments. Those skilled in the art will recognize that the techniques described herein in the context of symbol-level equalization can be readily adapted to chip-level equalization and vice-versa.

According to one embodiment for determining the geometry factor ρ, the geometry factor processing module 140 uses a pilot-based SIR estimate to compute the geometry factor ρ. The wireless receiver 110 includes an SIR estimation module 142 for generating the pilot-based SIR estimate based on channel estimates derived from a pilot channel such as CPICH (Common Pilot Channel) which is used in UMTS (Universal Mobile Telecommunications System) and other CDMA communications systems. The SIR value computed by the SIR estimation module 142 is proportional to the transmission power of the pilot channel. Accordingly, if the transmit power of the pilot channel is configured high, the SIR estimate will also be high in the same geometry. However, since the pilot transmission power from the transmitter 100 (e.g. a base station) is unknown at the wireless receiver 110, the pilot transmission power cannot be directly used to compute the geometry factor ρ. Instead, the pilot transmission power is estimated and this estimate is then used to calculate the geometry factor ρ.

For purely illustrative purposes only, several power estimation embodiments are described next with reference to the pilot channel CPICH.

One pilot channel transmission power estimation embodiment utilizes that the CPICH power relative to the total transmit power is fixed and may be configured by the transmitter 100 to be for example −12 dBm, but may vary between −7 dBm and −15 dBm. For WCDMA applications, the wireless receiver 110 controls the amplitude of the received signal via AGC (Automatic Gain Control) which applies a variable gain. The received power level after AGC is fixed. The fixed received signal level allows for optimal signal quantization. The AGC-controlled signal is then sent to various receiver despreaders including CPICH de-spreaders which are part of a despreader module 144.

Figure 2:
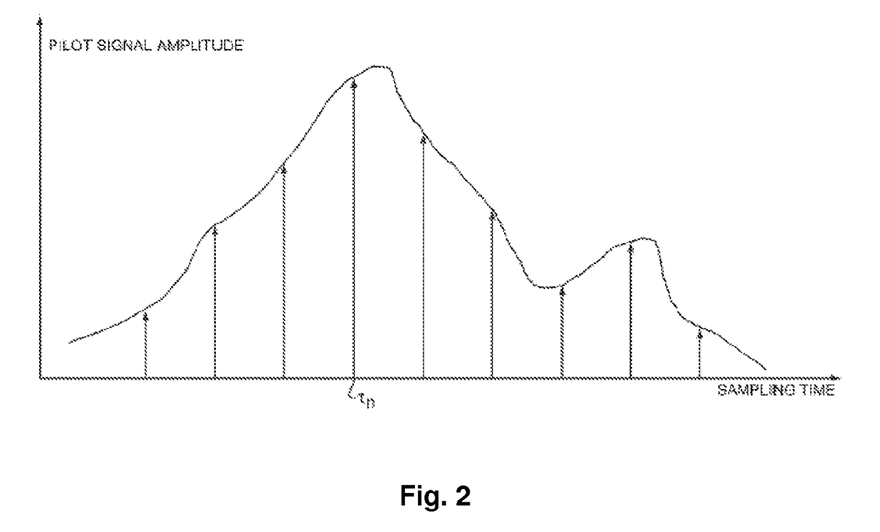
FIG. 2 illustrates a signal diagram of a pilot signal sampled at different path delays.

The total power at the output of all CPICH despreaders remains constant irrespectively of fading due to AGC compensation and irrespectively of sub-path energies in any multipath profile, as long as the equalizer fingers (symbol-level equalization) or equalizer taps (chip-level equalization) selected by a finger/tap placement and path searcher module 146 capture energy from those paths (i.e. all paths are covered by the fingers/taps). The equalizer fingers/taps are each set to a particular path delay selected by the finger/tap placement and path searcher module 146. FIG. 2 illustrates an exemplary received CPICH signal sampled at certain fixed intervals, each interval corresponding to a particular path delay τ. The area under the signal curve represents the total CPICH signal power. To compute power accurately, the sampled CPICH signal is filtered by a low-pass filter module 148. The whole power of the sampled CPICH signal is then integrated by a power estimation module 150 after low-pass filtering.

If all signal paths are covered by the fingers/taps, the whole energy of the sampled CPICH signal is integrated. The resulting total CPICH energy determines the CPICH power level respective to the total transmitted power. In most practical cases, the majority of CPICH energy is covered by the sampling grid of fingers/taps. The small part of the energy not covered by the fingers/taps may result in minor underestimation of the CPICH power. The power of additional paths which are not covered by the finger/tap grid and thus not available for power integration, may have their power estimated (with respect to the main paths), e.g. based on a path searcher report. The power estimation module 150 can include the power estimate for each of these additional path delays in the total estimate of CPICH power. A highly accurate CPICH power estimate (and hence geometry) is not required, and accuracy within +/−1 to 2 dB is usually sufficient.

Figure 3:
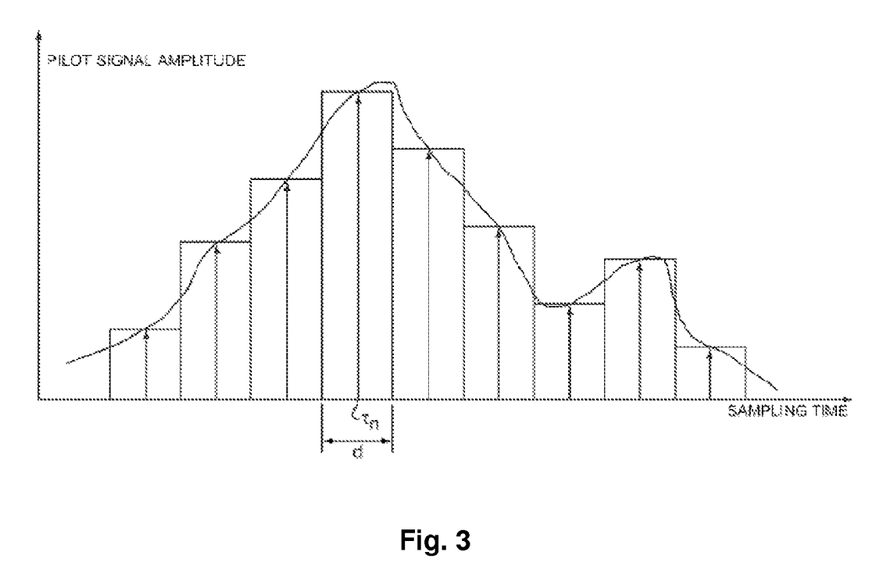
FIG. 3 illustrates a signal diagram of a pilot signal sampled at different path delays for which power is estimated based on a fixed spacing interval
Figure 4:
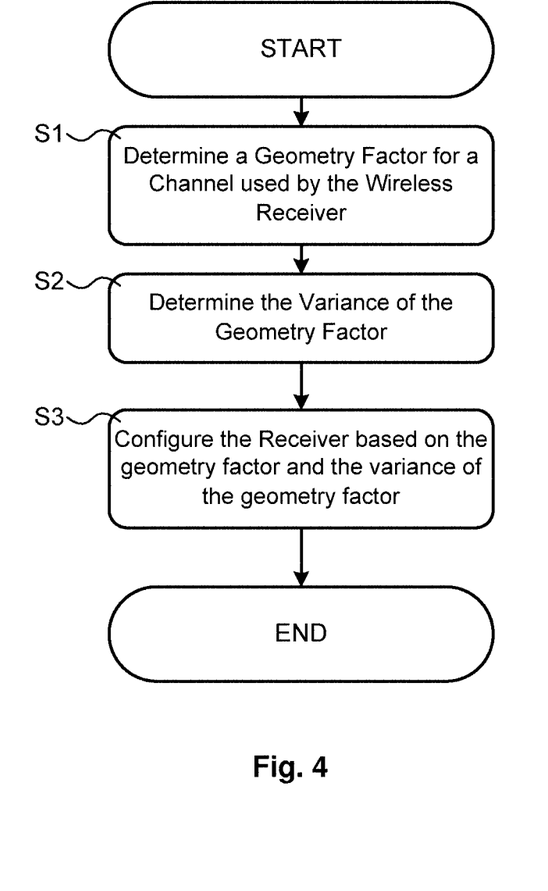
FIG. 4 is a flowchart illustrating a method according to embodiments of the present solution

In another pilot channel transmission power estimation embodiment, the transmit power of the pilot channel is not estimated via filtering and integration. Instead, the area under the sampled pilot signal curve is approximated by the power estimation module 150 with rectangles as shown in FIG. 3. Each rectangular area represents the CPICH amplitude for finger/tap delay $\tau_n$, multiplied by a spacing distance d. The CPICH amplitude can be converted into an instantaneous power estimate as given by:

$$\text{CPICH\_power}_{current} = \sum_{sum\_over\_peaks} \text{power\_estimates}_{CPICH}(\tau) \quad (2)$$

Given the pilot power estimate, the geometry factor ρ may be calculated as given by:

$$\rho = \frac{\text{CPICH\_power}_{filtered}}{SIR_{filtered}} \cdot d + \text{offset} \quad (3)$$

where $$SIR_{filtered}(n) = \lambda_A SIR_{filtered}(n-1) + (1-\lambda_A)SIR_{current} \quad (4)$$

and $$\text{CPICH\_power}_{filtered}(n) = \quad (5)$$
$$\lambda_B \text{CPICH\_power}_{filtered}(n-1) + (1-\lambda_B)\text{CPICH\_power}_{current}$$

Equations (4) and (5) smooth or filter the slot-based SIR and CPICH estimates over several slots using scaling constants $\lambda_A$ and $\lambda_B$, respectively. $SIR_{GRAKE\_current}$ and $\text{CPICH\_power}_{GRAKE\_current}$ are the current slot-based SIR and CPICH power estimates, respectively corresponding to slot n.

The power estimation module 150 can obtain the slot-based CPICH power estimate $\text{CPICH\_power}_{GRAKE\_current}$ from equation (2). The SIR estimation module 142 can obtain the slot-based SIR estimate for the pilot channel as given by:

$$SIR_{current} = \frac{|\hat{w}^H \hat{h}|^2}{\hat{w}^H \hat{R}_u \hat{w}} \qquad (6)$$

or equivalently, by:

$$SIR_{current} = \hat{w}^H \hat{h} \qquad (7)$$

In equations (6) and (7), $\hat{w}$ represents G-Rake combining weights computed by a combining weight computation module 152. The combining weights can be applied at the symbol or chip level. Either way, $\hat{h}$ represents the estimated net channel coefficients determined by a coefficient estimator module 154 and $\hat{R}_u$ is an estimate of the impairment covariance matrix also generated by the coefficient estimation module 154, H denotes Hermetian transpose. The offset value in equation (3) can be derived through simulation and depends on numerical implementation aspects, such as finger/tap spacing, and may also include compensation for path delays not covered by the finger/tap grid. According to the second pilot transmit power estimation embodiment described above, the pilot signal is despread by the despreading module 144 at path delays selected by the finger/tap placement and path searcher module 146 to generate despread pilot signal values. The power estimation module 150 multiples each despread pilot signal value by a delay spacing distance d as shown in FIG. 3. The results are summed to generate an instantaneous estimate of the transmit power level of the pilot channel at the wireless receiver 100 as given by equation (2).

According to either pilot channel transmit power estimation embodiment given as examples above, it is preferred that the geometry factor processing module 140 calculates the channel geometry factor ρ based on the pilot channel power estimate as given by equation (3), optionally with additional smoothing as given by equations (4) and (5).

According to another embodiment for determining the geometry factor ρ, the geometry factor processing module 140 uses combining weight correlation information to compute the geometry factor ρ. For example, equalization reduces to maximum ratio combining when the environment is noise-limited. As such, the correlation between the weights used for maximum ratio combining (i.e. Rake) and the weights used for equalization (i.e. G-Rake) can be considered. A correlation coefficient for maximum ratio combining and equalization combining weights is given by:

$$\sigma_{weights} = \frac{\hat{w}^H \hat{h}}{\sqrt{(\hat{w}^H \hat{w})(\hat{h}^H \hat{h})}} \qquad (8)$$

which can also be written as:

$$\sigma_{weights} = \frac{SIR_{GRAKE\_current}}{\sqrt{(\hat{w}^H \hat{w})(\hat{h}^H \hat{h})}} \qquad (9)$$

The instantaneous correlation coefficient given by equation (8) is likely to be noisy. Accordingly, smoothing/filtering can be applied to increase reliability as given by:

$$\tilde{\sigma}(n) = \beta\tilde{\sigma}(n-1) + (1+\beta)\sigma_{weights} \qquad (10)$$

where $0 \le \beta \le 1$.

Since high correlation between the combining weights and the net channel coefficients indicates low channel geometry, the geometry factor processing module 140 can assign the geometry factor ρ as given by:

if $\sigma(n) > \sigma_{thresh}$ then low geometry and $\rho = \rho_{low}$ else high geometry and $\rho = \rho_{high}$ \qquad (11)

The threshold value $\sigma_{thresh}$ is a correlation threshold that can be determined through simulation and/or measurement. Also, $\rho_{low}$ and $\rho_{high}$ are preferably coordinated with the geometry factor threshold $\rho_{thresh\_low}$ and $\rho_{thresh\_high}$ respectively being described in more detail later herein.

According to yet another embodiment for determining the geometry factor ρ, the geometry factor ρ is calculated based on SIR information. In a noise-limited environment, the SIR estimated via maximum ratio combining is very similar to the SIR estimated via G-Rake equalization. Therefore, the ratio of the two SIR values provides information about the geometry factor. In one embodiment, the geometry factor processing module 140 determines the geometry factor ρ as given by:

$$\rho = \frac{SIR_{RAKE\_filtered}}{SIR_{GRAKE\_filtered}} \qquad (12)$$

where $SIR_{GRAKE\_filtered}$ is given by equation (4) and $SIR_{RAKE\_filtered}$ at time sample n is given by:

$$SIR_{RAKE\_filtered}(n) = \lambda_C SIR_{RAKE\_filtered}(n-1) + (1-\lambda_C) SIR_{RAKE\_current} \qquad (13)$$

The SIR values can be generated by combining soft symbol values. Again, smoothing or filtering may be applied to the Rake SIR estimate $SIR_{RAKE\_filtered}$ over several slots as indicated by the scaling constant $\lambda_C$. The current Rake SIR value $SIR_{RAKE\_current}$ in equation (13) can be obtained from:

$$SIR_{GRAKE\_current} = \frac{|\hat{h}^H \hat{h}|^2}{\hat{h}^H \hat{R}_u \hat{h}} \qquad (14)$$

where $\hat{h}$ represents the estimated net channel coefficients and $\hat{R}_u$ is an estimate of the impairment covariance as explained previously herein.

It should be emphasized that the geometry factor ρ may be determined based on any suitable SIR value or similar, e.g. SIR value as those determined in the above equations 4, 6, 7 or 13 or other SIR values. Moreover, the geometry factor ρ may alternatively be determined based on an inverse of a SIR value or similar, possibly multiplied with a scaling factor or similar. A person skilled in the art having the benefit of this disclosure realizes that the geometry factor ρ may be obtained in many ways using any suitable measure or estimation or similar providing the same or similar results as those now mentioned.

The attention is now directed to the determination of the variance $\rho_v$ of the geometry factor ρ. The variance $\rho_v$ is a measure of the variation in time or rate of change of the geometry factor ρ. Mathematically the variance $\rho_v$ of the geometry factor ρ may e.g. correspond to the distribution of the geometry factor ρ. The geometry factor ρ may vary in a periodic or in a random fashion.

Several methods for obtaining the variance of the geometry factor can be envisioned. One exemplifying method may e.g. be based on a fast and slow component of the geometry factor.

To this end we may for example assume that the geometry factor ρ=x(n), where x(n) is for example: x(n)=SIR(n), or x(n)=I(n), that is the pilot channel CPICH SIR value, or the interference value, respectively, at a time sample n. Any suitable SIR value may be used in the expression x(n)=SIR(n), e.g. a SIR value determined according to any of equation 4, 6, 7 or 13 above.

Calculate the average value (slow component) of x(n), for example, as $$y_{ave}(n)=\lambda_1(x(n)-y_{ave}(n-1))+y_{ave}(n-1) \quad (15)$$

Here the filter coefficients $\lambda_1$ and $\lambda_2$, could be set to small value such as 1/512 or similar.

Then, calculate the ratio of the fast and slow components:

$$r(n) = \frac{x(n)}{y_{ave}(n)} \quad (16)$$

To assure that we always have a value greater than one (1) we may e.g. form:

$$z(n) = \max\left(r(n), \frac{1}{r(n)}\right) \quad (17)$$

Then filter z(n), for example, as:

$$z_{filt}(n)=\lambda_2(z(n)-z_{filt}(n-1))+z_{filt}(n-1) \quad (18)$$

The detection of changing inter-cell interference levels can then be made based on the $z_{filt}(n)$ values. In other words, here the variance $\rho_v$ of the geometry factor ρ is indicated by the $z_{filt}(n)$ values.

In another exemplifying method the variance $\rho_v$ of the geometry factor ρ may e.g. be computed according to a text book definition. That is, if ρ is the long term average of the geometry and $\hat{\rho}_n$ its samples, then compute the variance $\rho_v$ of the geometry factor ρ as:

$$\rho_v = \frac{1}{N-1}\sum_{n=1}^{N}(\rho-\hat{\rho}_n)^2 \quad (19)$$

where N is the number of samples.

In still another exemplifying method the variance $\rho_v$ of the geometry factor ρ may e.g. be indicated by the frequency components of the geometry factor ρ varying over time. The frequency components of a geometry factor ρ signal may e.g. be obtained by collecting a number of consecutive samples of the geometry factor ρ, e.g. determined as indicated above. The samples may then be used as input values for a transformation scheme that transforms the obtained geometry factor signal into the frequency domain. The transformation scheme may e.g. be a suitable Fourier transform or similar being well known to those skilled in the art.

Figure 5:
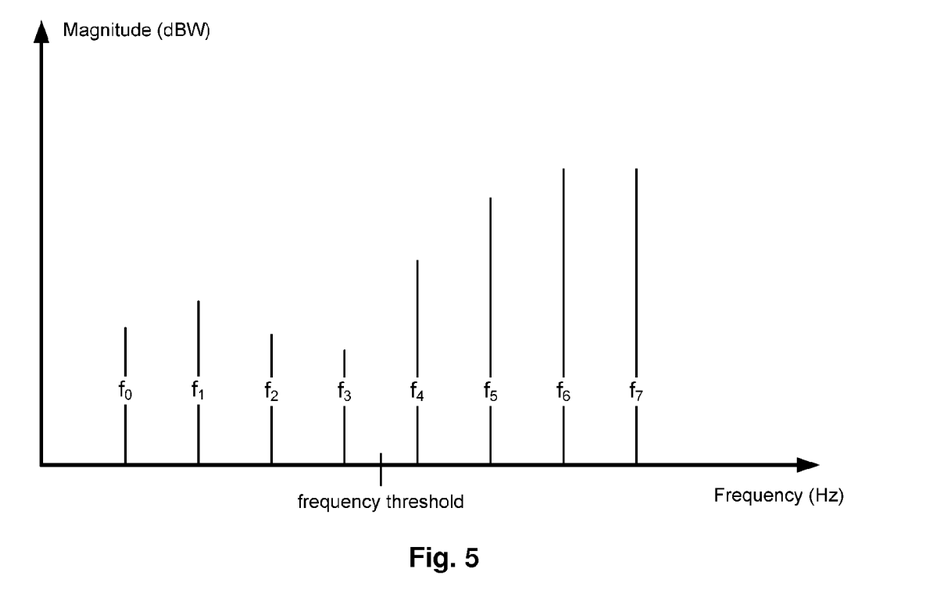
FIG. 5 is a schematic illustration of the distribution of the frequency components of an exemplifying obtained geometry factor signal.

FIG. 5 is a schematic illustration of the distribution of the frequency components of an exemplifying geometry factor signal. For the sake of simplicity it is assumed that the exemplifying geometry factor signal has eight (8) frequency components $f_0$-$f_7$. Each frequency component $f_0$-$f_7$ is represented by a vertical bar. The position of a certain bar on the x-axis indicates the frequency represented by the bar in question. The height of a certain bar indicates the magnitude (i.e. the energy) of the frequency component represented by the bar in question. Here, the variance $\rho_v$ of the geometry factor ρ may e.g. be obtained by analyzing the amount of energy represented by the frequency components. For example, the variance $\rho_v$ of the geometry factor ρ may be considered as high when the total amount of energy represented by the frequency components above a certain frequency threshold (e.g. 20 Hz) exceeds a power threshold (e.g. 30% of the total energy/power in the spectrum of the geometry factor).

Figure 6:
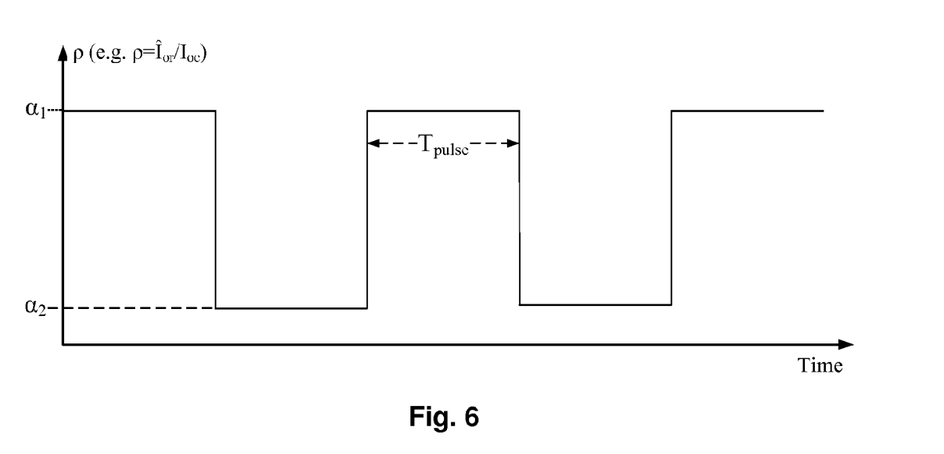
FIG. 6 illustrates exemplifying changing inter-cell interference levels pattern

The variance $\rho_v$ of the geometry factor ρ may e.g. be illustrated by a changing inter-cell interference levels pattern as depicted in FIG. 6. Here, the geometry factor ρ changes every 24 ms (12 TTI) between a high geometry factor ρ (indicated by $\alpha_1$ in FIG. 6) and a low geometry factor ρ (indicated by $\alpha_2$ in FIG. 6). FIG. 6 corresponds to the test scenario illustrated in FIG. 9.1 of the 3GPP TS 25.101 V9.5.0 (2010-09) specification. With reference to this test scenario the variance $\rho_v$ of the geometry factor ρ may e.g. be considered as high when the geometry factor ρ changes between a high value and a lower value every 24 ms, and as low when the geometry factor ρ changes more slowly, e.g. only changes between a high value and a lower value every 100 ms or every 200 ms or even slower or when there is substantially no change in the geometry factor ρ at all regardless of the fading condition.

A person skilled in the art having the benefit of this disclosure realizes that the variance $\rho_v$ of the geometry factor ρ may be obtained in many other ways using any other suitable measure or estimation or similar providing the same or similar results as those now mentioned.

The geometry factor ρ and the variance $\rho_v$ of the geometry factor ρ are then used to configure one or more of the signal processing modules of the wireless receiver 110. The term "configure" as used herein refers to the control, function and/or interconnection of the various sub-algorithms implemented by the signal processing modules that make up the overall wireless receiver 110, as well as the sub-algorithm parameter settings. The signal processing modules can be implemented in dedicated or shared hardware, software, firmware, or some combination thereof. With this understanding, one or more of the signal processing modules can be configured based on the channel geometry.

According to one configuring embodiment, the number of equalizer fingers (symbol-level equalization) or equalizer taps (chip-level equalization) used by the wireless receiver 100 for interference cancellation is determined by the geometry factor processing module 140. In low geometry scenarios, it is beneficial to reduce the number of fingers/taps and use only the strongest ones. More fingers/taps are beneficial for other geometry scenarios. In one exemplifying fingers/taps configuring embodiment, the number of fingers/taps is determined as given by:

if $\rho<\rho_{threshold\_low}$ (i.e. ρ is low, $\rho_v$ may be high or low)

then N1 fingers/taps are selected for interference cancellation, else if $\rho<\rho_{threshold\_high}$ and $\rho_v>\rho_{v\_threshold}$ (i.e. ρ is medium, $\rho_v$ is high)

then N1 fingers/taps are selected for interference cancellation, else if $\rho<\rho_{threshold\_high}$ (i.e. $\rho$ is medium, $\rho_v$ is low)

then N2 fingers/taps are used for interference cancellation (N2≥N1), else if $\rho_v>\rho_{v\_threshold}$ (i.e. $\rho$ is high, $\rho_v$ is high)

then N2 fingers/taps are used for interference cancellation (N2≥N1), else N3 fingers/taps are used for interference cancellation (N3>N2≥N1) (i.e. $\rho$ is high, $\rho_v$ is low)  (20)

where $\rho$ is the previously computed geometry factor, $\rho_v$ is the previously computed variance of the geometry factor, $\rho_{threshold\_low}$ is a lower threshold value and $\rho_{threshold\_high}$ is a higher upper threshold value and $\rho_{v\_threshold}$ is a variance threshold above which the variance $\rho_v$ is considered to be high.

Generally, in a purely exemplary embodiment, $\rho_{threshold\_low}$ can be 0 dB, $\rho_{threshold\_high}$ can be 15 dB and $\rho_{v\_threshold}$ can be 5 (dimensionless). In some embodiments, equalization is disabled when the geometry factor falls below the lower threshold value. Under this scenario, the wireless receiver 110 is configured for maximum ratio combining.

According to another configuring embodiment, the nonparametric impairment covariance matrix estimate $\hat{R}_u$ generated by the coefficient estimation module 154 is filtered as a function of the geometry factor $\rho$. Lower channel geometries cause such matrices to be noisy, so increased filtering enables improved equalization performance. Less filtering is beneficial for medium and high geometry factors so that higher receiver speeds can be supported. In one embodiment, filtering constants applied to the nonparametric impairment covariance matrix estimate $\hat{R}_u$ are determined by the geometry factor processing module 140 as a function of the geometry factor $\rho$ as given by:

if $\rho<\rho_{threshold\_low}$ (i.e. $\rho$ is low, $\rho_v$ may be high or low)

then $\hat{R}_u(n)=\alpha_{low}\hat{R}_u(n-1)+(1-\alpha_{low})\hat{R}_u$ else if $\rho<\rho_{threshold\_high}$ and $\rho_v>\rho_{v\_threshold}$ (i.e. $\rho$ is medium, $\rho_v$ is high)

then again $\hat{R}_u(n)=\alpha_{low}\hat{R}_u(n-1)+(1-\alpha_{low})\hat{R}_u$ else if $\rho<\rho_{threshold\_high}$ (i.e. $\rho$ is medium, $\rho_v$ is low)

then $\hat{R}_u(n)=\alpha_{medium}\hat{R}_u(n-1)+(1-\alpha_{medium})\hat{R}_u$, else if $\rho_v>\rho_{v\_threshold}$ (i.e. $\rho$ is high, $\rho_v$ is high)

then again $\hat{R}_u(n)=\alpha_{medium}\hat{R}_u(n-1)+(1-\alpha_{medium})\hat{R}_u$, else $\hat{R}_u(n)=\alpha_{high}\hat{R}_u(n-1)+(1-\alpha_{high})\hat{R}_u$ (i.e. $\rho$ is high, $\rho_v$ is low)  (21)

where $\hat{R}_u(n)$ is the filtered covariance matrix estimate corresponding to slot n, and $\hat{R}_u$ is the current slot-based estimate of the covariance matrix, and preferably $0\leq\alpha_{high}\leq\alpha_{medium}\leq\alpha_{low}\leq1$ The filtering applied is a type of IIR (Infinite Impulse Response) filtering, where the different $\alpha$ values determine the filter bandwidth. In a purely exemplary embodiment, $\alpha_{high}\approx0.90$ and $\alpha_{low}\approx0.99$ The filtering of parameter estimates for other receiver algorithms can also be varied as a function of the geometry factor $\rho$ and the variance $\rho_v$ of the geometry factor $\rho$. In some filter configuring embodiments, algorithms based on pilot information also benefit from increased filtering, whether applied directly to pilots or indirectly to the final output of the algorithms. For example AFC (Automatic Frequency Control), AGC and SIR estimation algorithms are each based on pilot sequences, and either the input pilot sequence or the algorithm output can be more intensively filtered (i.e. longer memory in filtering algorithm) in low geometry scenarios. As with covariance estimation, less filtering may be beneficial for medium and high geometry scenarios.

In a purely representative filter configuring embodiment, an SIR estimate generated by the SIR estimation module 142 is filtered by the geometry factor processing module 140 based on the geometry factor $\rho$ and the geometry factor variance $\rho_v$, as given by:

if $\rho<\rho_{threshold\_low}$ (i.e. $\rho$ is low, $\rho_v$ may be high or low)

then $SIR_{filt}(n)=\lambda_{low}SIR_{filt}(n-1)+(1-\lambda_{low})SIR_{inst}$ else if $\rho<\rho_{threshold\_high}$ and $\rho_v>\rho_{v\_threshold}$ (i.e. $\rho$ is medium, $\rho_v$ is high)

then again $SIR_{filt}(n)=\lambda_{low}SIR_{filt}(n-1)+(1-\lambda_{low})SIR_{inst}$ else if $\rho<\rho_{threshold\_high}$ (i.e. $\rho$ is medium, $\rho_v$ is low)

then $SIR_{filt}(n)=\lambda_{medium}SIR_{filt}(n-1)+(1-\lambda_{medium})SIR_{inst}$ else if $\rho_v>\rho_{v\_threshold}$ (i.e. $\rho$ is high, $\rho_v$ is high)

then again $SIR_{filt}(n)=\lambda_{medium}SIR_{filt}(n-1)+(1-\lambda_{medium})SIR_{inst}$ else $SIR_{filt}(n)=\lambda_{high}SIR_{filt}(n-1)+(1-\lambda_{high})SIR_{inst}$ (i.e. $\rho$ is high, $\rho_v$ is low)  (22)

where $SIR_{filt}(n)$ is the filtered SIR estimate corresponding to slot n, and $SIR_{inst}$ is the current slot-based SIR estimate, e.g. as given by equation (6) or (7), and $0\leq(\lambda_{low},\lambda_{medium},\lambda_{low})\leq1$ The exact filtering parameters depend on geometry estimation, receiver implementation details, and other factors such as channel dispersiveness etc. Optimal parameters can be estimated from either simulation or determined by measurement.

In yet another configuring embodiment, the number of parameters estimated for use by the wireless receiver 110 when configured as a parametric G-Rake receiver is determined by the geometry factor processing module 140. For example, a scaling factor for white noise is very difficult to estimate reliably for high geometry factors because the scaling factor is very small under these conditions. Improved performance can be obtained if the white noise scaling factor is set to a small fixed value and only the impairment scaling factor is estimated. In one embodiment, only the impairment scaling factor is estimated for high geometry scenarios when the variance $\rho_v$ of the geometry is low. For low and medium geometry scenarios and for high geometry scenarios when the variance $\rho_v$ of the geometry is high, both the white noise and the impairment scaling factors are estimated.

In still another configuring embodiment, the amount of soft scaling applied to symbols received by the wireless receiver 110 which are subject to interference caused by a downlink SCH (Synchronization control CHannel) is determined as a function of the geometry factor $\rho$ and the variance $\rho_v$ of the geometry factor. For example, symbols transmitted during the same time as the SCH synchronization chip sequence are subject to additional interference from the SCH. For power-controlled transmission scenarios, SCH interference becomes problematic in high geometry scenarios, when transmit power is dropped. As such, un-cancelled SCH interference becomes more dominant and the receiver 110 benefits by reducing the amplitude of soft-bits affected by the SCH sequence. In one embodiment, the geometry factor processing module 140 provides one soft bit scaling for SCH-affected symbols for high geometry factors when the variance $\rho_v$ of the geometry is low, and another soft bit scaling for low and medium geometry factors, and for high geometry scenarios when the variance $\rho_v$ of the geometry is high. The geometry factor processing module 140 can also enable or disable the SCH interference cancelling module 156 as a function of the geometry factor $\rho$ and the variance $\rho_v$ of the geometry factor. The SCH cancelling module 156 typically provides the most benefit for medium to high geometry scenarios, because for lower geometry, channel noise dominates SCH interference. Therefore, enabling the SCH cancelling module 156 for medium and high channel geometry scenarios when the variance $\rho_v$ of the geometry is low and disabling the SCH cancelling module 156 for low geometries and for medium geometries when the variance $\rho_v$ is high improves receiver performance. In addition, the geometry factor processing module 140 can also select appropriate SCH canceller parameters for medium or high geometry factors.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of configuring a wireless receiver, comprising:
   determining a geometry factor for a channel over which signals are transmitted to the wireless receiver, the geometry factor being a measure indicative of a relationship between signal power transmitted in a cell and inter-cell interference plus noise power at the wireless receiver;
   determining a variance of the determined geometry factor, the variance being a measure indicative of the variation in time or rate of change of the geometry factor; and
   configuring the wireless receiver based on the geometry factor and the variance of the geometry factor.

2. The method according to claim 1, wherein determining the geometry factor comprises:
   estimating a signal-to-interference ratio, SIR, at the wireless receiver; and
   determining the geometry factor based on the SIR estimate.

3. The method according to claim 2, comprising:
   estimating the SIR based on channel estimates derived by the wireless receiver from a pilot signal transmitted over a pilot channel, the pilot channel having a transmit power level which is unknown to the wireless receiver;
   estimating the transmit power level of the pilot channel at the wireless receiver;
   determining the geometry factor based on a ratio of the pilot channel transmit power level estimate to the SIR estimate.

4. The method according to claim 1, wherein determining the geometry factor comprises:
   computing combining weights and net channel coefficients by the wireless receiver;
   determining a degree of correlation between the combing weights and the net channel coefficients; and
   determining the geometry factor based on the degree of correlation between the combing weights and the net channel coefficients.

5. The method according to claim 4, comprising:
   setting the geometry factor to a first value indicating a relatively high degree of interference responsive to the degree of correlation being above a particular first threshold value set by the wireless receiver; and
   otherwise setting the geometry factor to a second value indicating a relatively low degree of interference.

6. The method according to claim 1, wherein determining the geometry factor comprises:
   computing a first SIR value when the wireless receiver is configured as a maximum ratio combining receiver and a second SIR value when the wireless receiver is configured as an equalizing receiver; and
   determining the geometry factor based on a ratio of the first and second SIR values.

7. The method according to claim 1, wherein determining the variance of the geometry factor comprises:
   computing an average value of the geometry factor;
   computing a ratio of said geometry factor and said average value;
   obtaining the largest value of said ratio and the inverse of said ratio; and
   determining the variance of the geometry factor based on said largest value.

8. The method according to claim 1, wherein determining the variance of the geometry factor comprises:
   computing an average of the geometry factor;
   computing for a number of sampled values of the geometry factor, a difference between the average of the geometry factor and each of said sampled values of the geometry factor;
   computing a mean value of the sum of each difference; and
   determining the variance of the geometry factor based on said mean value.

9. The method according to claim 1, wherein determining the variance of the geometry factor comprises:
   obtaining frequency components of the geometry factor, which geometry factor varies over time; and
   determining the variance of the geometry factor by analyzing an amount of energy represented by the frequency components.

10. The method according to claim 1, wherein the configuring comprises configuring one or more functions or algorithms implemented by one or more receiver signal processing circuits of the receiver based on the geometry factor and the variance of the geometry factor, and/or configuring one or more parameters being input to the receiver signal processing circuits based on the geometry factor and the variance of the geometry factor.

11. The method according to claim 10, wherein the configuring comprises determining, as a function of the geometry factor and the variance of the geometry factor, a number of equalizer fingers or equalizer taps used by the wireless receiver for cancelling interference.

12. The method according to claim 11, further comprising disabling equalization at the wireless receiver and configuring the wireless receiver for maximum ratio combining responsive to the geometry factor being below a particular second threshold and the variance of the geometry factor being above a particular third threshold.

13. The method according to claim 10, wherein the configuring comprises determining, as a function of the geometry factor and the variance of the geometry factor, an amount of filtering applied to one or more estimates generated by the one or more signal processing circuits of the wireless receiver.

14. The method according to claim 13, comprising determining, as a function of the geometry factor and the variance of the geometry factor, an amount of filtering applied to at least one of a non-parametric impairment covariance estimate and an SIR estimate generated by the wireless receiver.

15. The method according to claim 10, wherein the configuring comprises determining, as a function of the geometry factor and the variance of the geometry factor, a number of parameters estimated by the wireless receiver during parametric equalization.

16. The method according to claim 10, wherein the configuring comprises determining, as a function of the geometry factor and the variance of the geometry factor, an amount of soft scaling applied to symbols received by the wireless receiver which are subject to interference caused by a downlink synchronization channel.

17. The method according to claim 1, comprising determining, as a function of the geometry factor and the variance of the geometry factor, whether to enable or disable an interference canceller circuit of the wireless receiver and wherein the interference canceller circuit is configured to suppress the interference caused by the downlink synchronization channel.

18. A wireless receiver, comprising:
a geometry factor processing circuit configured to determine a geometry factor for a channel over which signals are transmitted to the wireless receiver, the geometry factor being a measure indicative of a relationship between signal power transmitted in a cell and intra-cell interference plus noise power at the wireless receiver; and
a geometry factor variance processing circuit configured to determine a variance of the geometry factor, the variance being a measure indicative of the variation in time or rate of change of the geometry factor,
wherein:
the wireless receiver is configured to be configured based on the geometry factor and the variance of the geometry factor.

19. The wireless receiver according to claim 18, comprising a signal-to-interference ratio, SIR, estimation circuit configured to generate a SIR estimate, and wherein the geometry factor processing circuit is configured to determine the geometry factor based on the SIR estimate.

20. The wireless receiver according to claim 18, wherein the geometry factor variance processing circuit is configured to compute an average value of the geometry factor, and compute a ratio of said geometry factor and said average value, and obtain the largest value of said ratio and the inverse of said ratio, and determine the variance of the geometry factor based on said largest value.

21. The wireless receiver according to claim 18, wherein the geometry factor variance processing circuit is configured to compute an average of the geometry factor, and to compute for a number of samples of the geometry factor, a difference between the average of the geometry factor and each of said sampled value of the geometry factor, and to compute a mean value of the sum of each difference, and to determine the variance of the geometry factor based on said mean value.

22. The wireless receiver according to claim 18, wherein the geometry factor variance processing circuit is configured to
obtain frequency components of the geometry factor, which geometry factor varies over time; and
determine the variance of the geometry factor by analyzing the amount of energy represented by the frequency components.

23. The wireless receiver according to claim 18, wherein at least one of the geometry factor processing circuit and the geometry factor variance processing circuit is configured to configure one or more functions or algorithms implemented by one or more receiver signal processing circuits of the receiver based on the geometry factor and the variance of the geometry factor, and/or configuring one or more parameters being input to the receiver signal processing circuits based on the geometry factor and the variance of the geometry factor.

24. The wireless receiver according to claim 23, wherein at least one of the geometry factor processing circuit and the geometry factor variance processing circuit is currently amended to determine, as a function of the geometry factor and the variance of the geometry factor, a number of equalizer fingers or equalizer taps for interference cancellation.

25. The wireless receiver according to claim 24, wherein at least one of the geometry factor processing circuit and the geometry factor variance processing circuit is configured to disable equalization and enable maximum ratio combining at the wireless receiver responsive to the geometry factor being below a particular threshold and the variance of the geometry factor being above a particular threshold.

26. The wireless receiver according to claim 23, wherein at least one of the geometry factor processing circuit and the geometry factor variance processing circuit is configured to determine, as a function of the geometry factor and the variance of the geometry factor, an amount of filtering applied to one or more estimates generated by the one or more signal processing circuits.

27. The wireless receiver according to claim 23, wherein at least one of the geometry factor processing circuit and the geometry factor variance processing circuit is configured to determine, as a function of the geometry factor and the variance of the geometry factor, a number of parameters estimated during parametric equalization.

28. The wireless receiver according to claim 23, wherein at least one of the geometry factor processing circuit and the geometry factor variance processing circuit is configured to determine whether to enable or disable an interference canceller circuit as a function of the geometry factor and the variance of the geometry factor, and wherein the interference canceller circuit is configured to suppress the interference caused by the downlink synchronization channel.

* * * * *

UNITED STATES PATENT AND TRADEMARK OFFICE
CERTIFICATE OF CORRECTION

PATENT NO. : 8,848,762 B2  
APPLICATION NO. : 13/021438  
DATED : September 30, 2014  
INVENTOR(S) : Jonsson et al.

Page 1 of 1

It is certified that error appears in the above-identified patent and that said Letters Patent is hereby corrected as shown below:

In the specification

In Column 9, Line 35, delete "receiver 100" and insert -- receiver 110 --, therefor.

In Column 12, Lines 50-51, delete "receiver 100" and insert -- receiver 110 --, therefor.

In the claims

In Column 15, Line 66, in Claim 4, delete "combing" and insert -- combining --, therefor.

In Column 16, Line 2, in Claim 4, delete "combing" and insert -- combining --, therefor.

In Column 17, Line 38, in Claim 18, delete "wherein:" and insert -- wherein, --, therefor.

Signed and Sealed this  
Sixth Day of October, 2015

Michelle K. Lee  
*Director of the United States Patent and Trademark Office*